US008146221B2

(12) United States Patent
Hung

(10) Patent No.: US 8,146,221 B2
(45) Date of Patent: Apr. 3, 2012

(54) HYDRAULIC TOOL

(76) Inventor: Jung-Liang Hung, Minsyong Township, Chiayi County (TW)

( * ) Notice: Subject to any disclaimer, the term of this patent is extended or adjusted under 35 U.S.C. 154(b) by 752 days.

(21) Appl. No.: 12/255,714

(22) Filed: Oct. 22, 2008

(65) Prior Publication Data

US 2010/0095499 A1 Apr. 22, 2010

(51) Int. Cl.
*B23P 19/04* (2006.01)
*B25B 27/00* (2006.01)
*B25B 27/14* (2006.01)
*B23Q 3/08* (2006.01)

(52) U.S. Cl. ................ 29/252; 29/244; 29/255; 29/270; 29/278; 269/32; 269/24; 269/25; 269/26; 269/27

(58) Field of Classification Search ............ 29/244–280; 269/32, 24–27
See application file for complete search history.

(56) References Cited

U.S. PATENT DOCUMENTS

| | | | | |
|---|---|---|---|---|
| 4,471,805 | A * | 9/1984 | Solie et al. | 137/596.12 |
| 5,224,254 | A * | 7/1993 | McPeak et al. | 29/261 |
| 5,233,740 | A * | 8/1993 | Chen | 29/252 |
| 5,419,027 | A * | 5/1995 | McPeak et al. | 29/252 |
| 5,896,639 | A * | 4/1999 | Chen | 29/261 |
| 6,266,861 | B1 * | 7/2001 | Chen | 29/261 |
| 6,895,646 | B1 * | 5/2005 | Houg | 29/252 |

* cited by examiner

*Primary Examiner* — Monica Carter
*Assistant Examiner* — Nirvana Deonauth
(74) *Attorney, Agent, or Firm* — Alan Kamrath; Kamrath IP Lawfirm, PA

(57) ABSTRACT

A hydraulic tool for assembling and disassembling components, such as gears, bearings, etc. of a shaft, is capable of performing an external-pulling or an internal-pulling operation as desired for an object to be assembled or disassembled. The hydraulic tool includes an oil pressure assembly having a hand-operated pump, an oil storage member, a control valve, an oil pressure tank, a set of external pulling type clamping jaws, internal pulling type clamping jaws, and a bolt for assembling purpose. The hydraulic tool has high mobility and portability, is capable of performing assembling or disassembling operations at any angle and position, and is considerably enhanced in applicability.

2 Claims, 22 Drawing Sheets

HYDRAULIC TOOL

BACKGROUND OF THE INVENTION

1. Field of the Invention

The present invention relates to a hydraulic tool and, more particularly, to a hydraulic tool for assembling and disassembling components (such as gears, bearings, etc.) of a shaft, and which is capable of performing an external-pulling or an internal pulling operation for an object to be assembled or disassembled.

2. Description of the Prior Art

The current gear puller for disassembling components (such as gears, bearings, etc.) disposed on the shaft usually has only a single function (for example, a function of performing an external-pulling or an internal-pulling operation for pulling out a component). Therefore, disassembling different types of components requires the use of different gear pullers, which not only increases the cost for buying more gear pullers, but also the gear puller is also restricted in application scope.

The present invention has arisen to mitigate and/or obviate the afore-described disadvantages.

SUMMARY OF THE INVENTION

The present invention provides a hydraulic tool which is enhanced in applicability and flexibility by being capable of performing an external-pulling or an internal pulling operation for an object to be assembled or disassembled.

The primary object of the present invention is to provide a hydraulic tool, when performing an external-pulling operation for an object to be disassembled, using each of the clamping claws to press against an outer periphery of the object while pushing an axial shaft at one end of an oil pressure tank against a shaft of the object.

A handle fixed to a control valve is moved toward a side to move the oil pressure tank forward, so that oil from an inlet of the oil storage member flows into the oil pressure tank via a first oil passage to push a piston of the oil pressure tank outward. Accordingly, the axial shaft connected at the end of the piston rod is also pushed outward. At the same time, when the pressure of the oil flowing into the oil pressure tank reaches a maximum value, the oil will flow through an oil chamber inside of the piston rod to a second oil passage, will then flow through a third oil passage into a return passage, and, finally, will flow back into the oil storage member via a fourth oil passage at one end of the inlet.

The secondary object of the present invention is to provide hydraulic tool, when performing an internal-pulling operation for an object to be disassembled, using each of its clamping jaws to clamp against a bottom of an inner periphery of a central hole of the object to be disassembled to pull the object upward. Meanwhile, each of the clamping jaws is pressed against a peripheral component around the object.

A handle fixed to a control valve is moved toward another side so that oil from an outlet of an oil storage member will flow into a sixth oil passage at one end of an oil pressure tank via a fifth oil passage, will flow into a piston rod and, then, into an oil chamber at the other end of the oil pressure tank, thus pushing the piston together with an axial shaft connected at one end of the piston rod backward. At the same time, the oil of the oil chamber at a front end of the oil pressure tank can flow out via an outlet to a seventh oil passage of a control valve and then flow through an eighth oil passage at one end of the inlet of the oil storage member and back into the oil storage member.

The third object of the present invention is to provide a hydraulic tool, when performing an internal-pulling operation for an object to be assembled, having one end of a shaft portion of the bolt screwed with an axial shaft at one end of an oil pressure tank and having another end of the bolt connected with a shaft of the object, by pressing each of clamping claws against the object.

A handle fixed to a control valve is moved toward another side to make the oil pressure tank move backward. When the oil pressure tank moves backward, it simultaneously pulls out the shaft of the object connected to the end of the axial shaft, thus reversely pushing the object onto the shaft.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
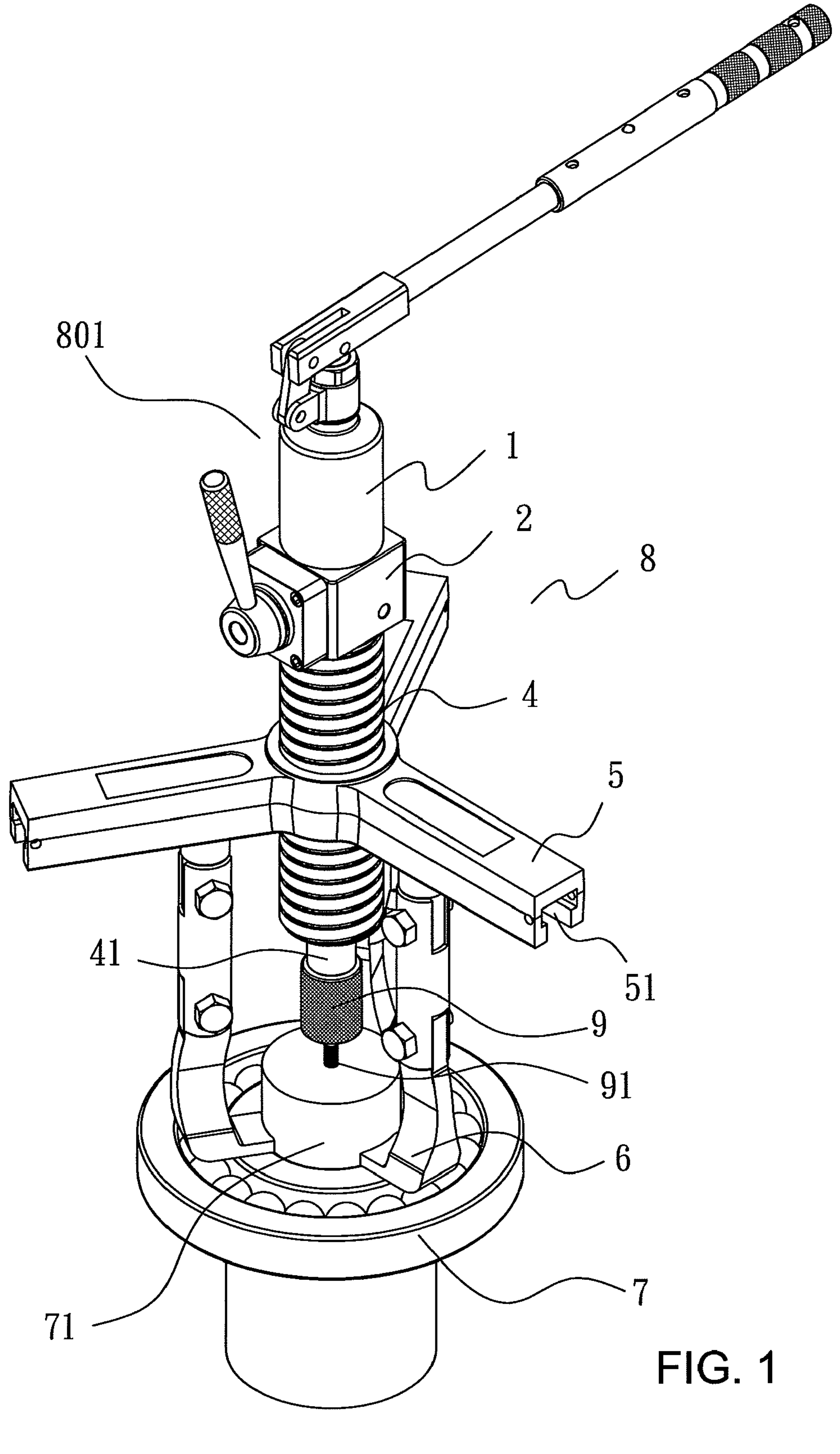
FIG. 1 is a perspective view showing the assembling operation performed by a hydraulic tool in accordance with the present invention.
Figure 2:
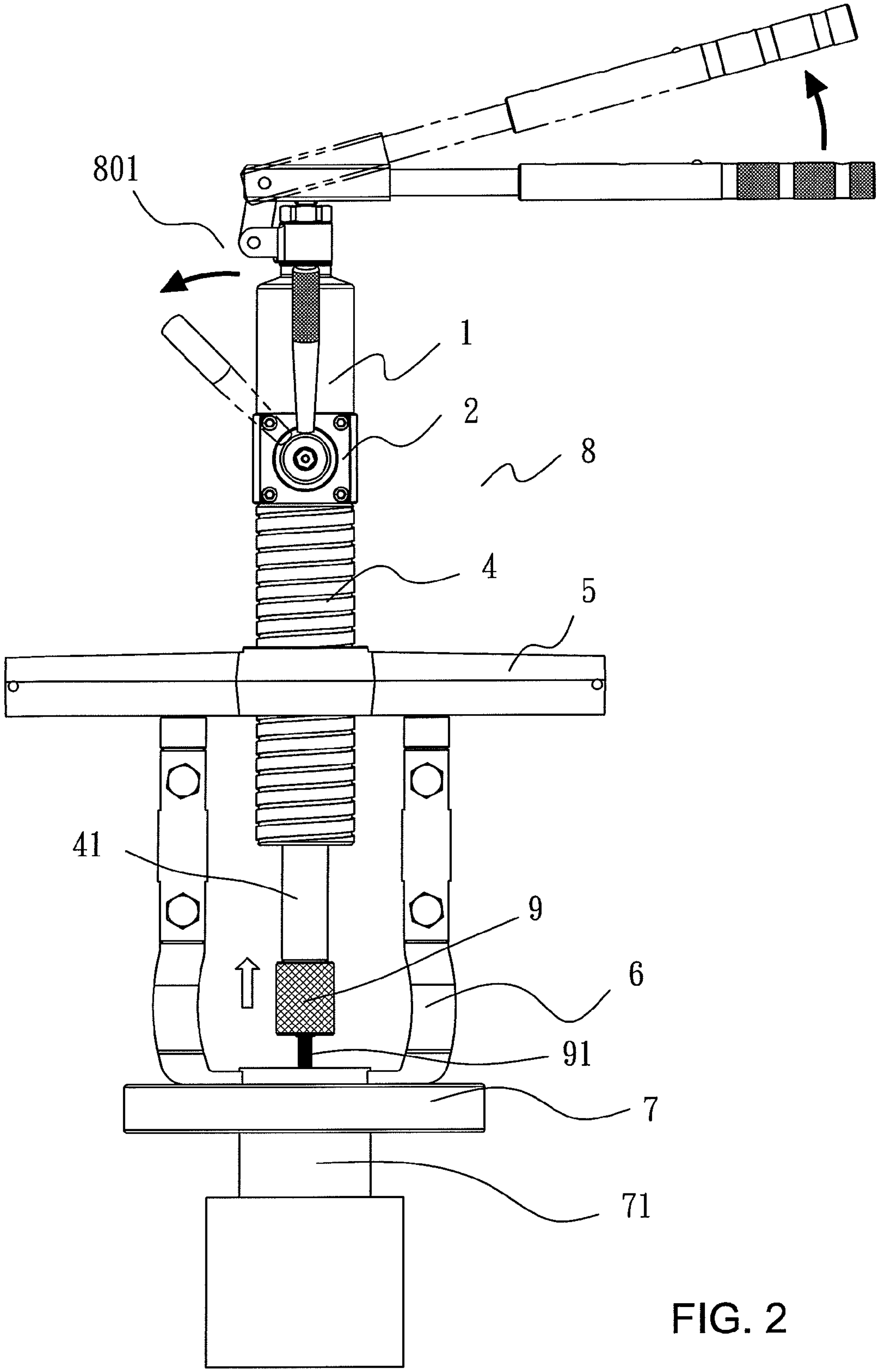
FIG. 2 is a front view showing the assembling operation performed by the hydraulic tool in accordance with the present invention.

Referring to FIGS. 1 and 2, a hydraulic tool 8 in accordance with the present invention which is capable of performing external-pulling or internal-pulling operation for an object to be assembled or disassembled comprises a control valve 2 with one end connected with an oil storage member 1. The other end of the control valve 2 is connected with an oil pressure tank 3 which is provided with an adjustment threaded portion 4 on the outer surface thereof. Screwed on the adjustment threaded portion 4 is a bracket 5 with a plurality of radially-arranged slide rails 51 facing downward. Plural clamping jaws 6 with articulated joints are disposed in the respective slide rails 51, and disposed at one end of the oil storage member 1 is a hand-operated hydraulic pump 801.

Figure 2A:
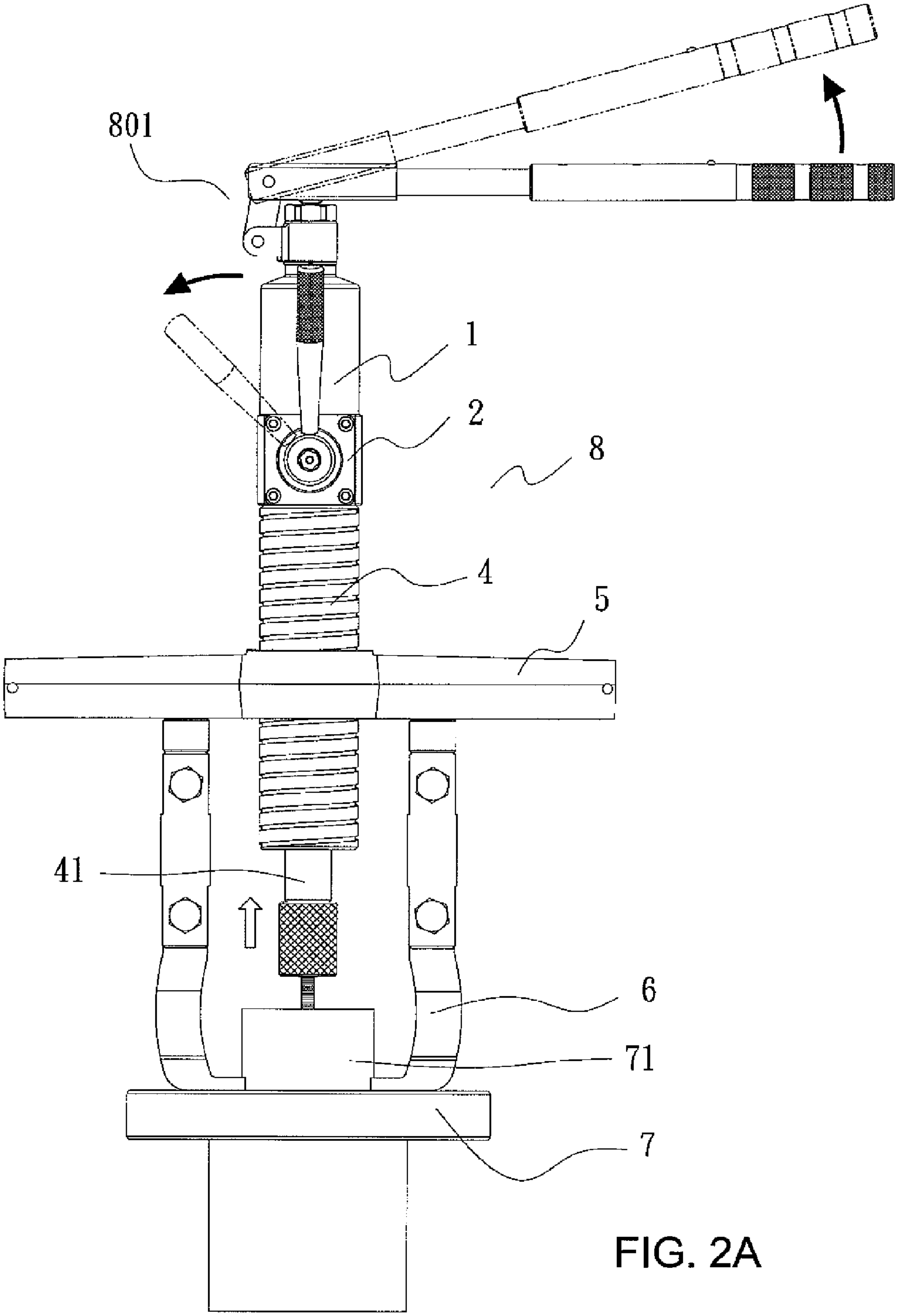
FIG. 2A shows the object assembled onto the shaft by the hydraulic tool in accordance with the present invention.

Therefore, one end of a shaft portion 91 of the bolt 9 is screwed with an axial shaft 41 at one end of the oil pressure tank 3, and another end of the bolt 9 is connected with a shaft 71 of a to-be-assembled object 7 (here it is a bearing for example), namely, by pressing each of the clamping claws 6 against the object 7. When the oil pressure tank 3 moves backward, it can simultaneously pull out the shaft 71 of the object 7 connected to the end of the axial shaft 41, thus reversely pushing the object 7 onto the shaft 71, as shown in FIGS. 1, 2 and 2A.

Figure 3:
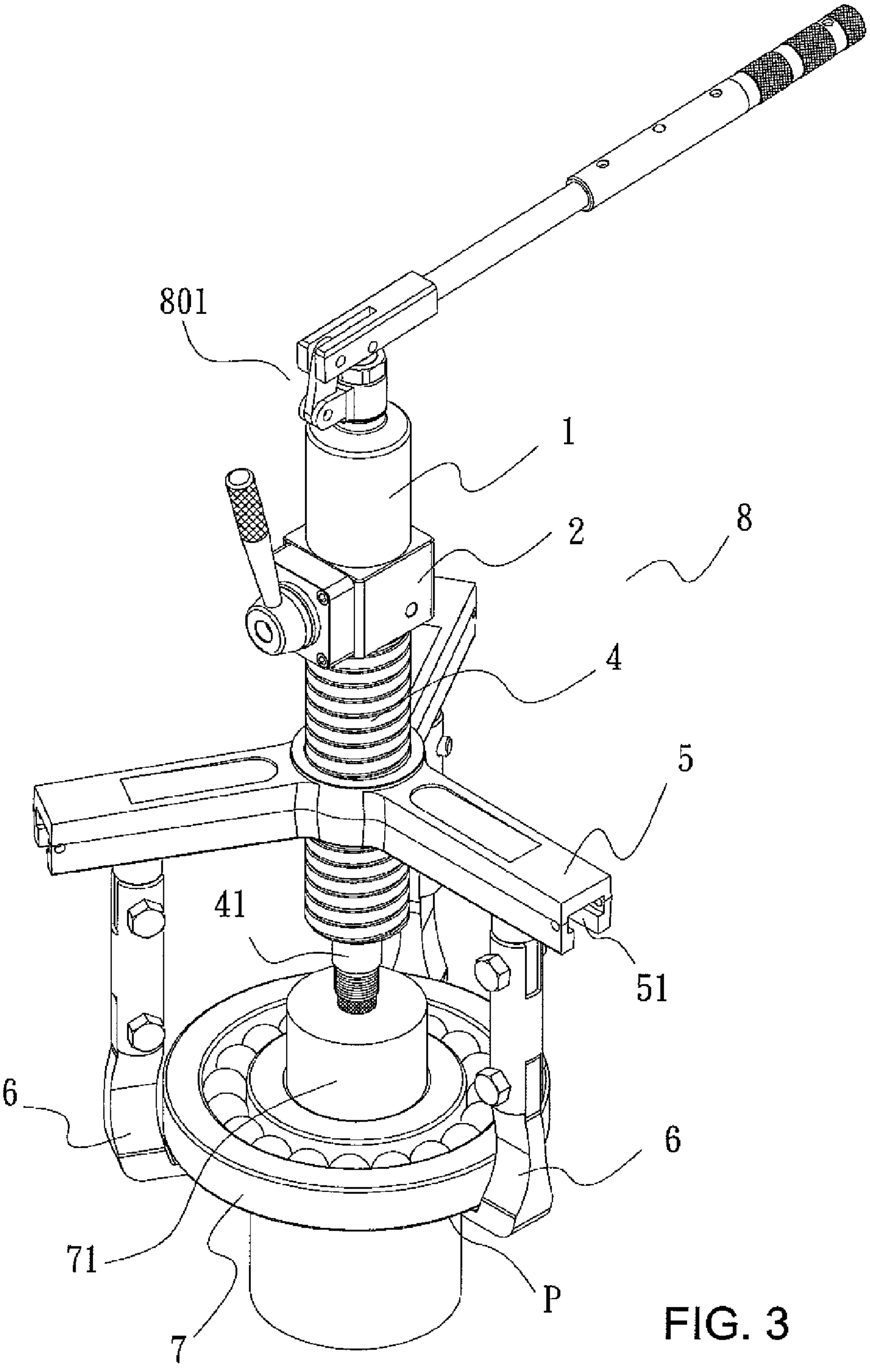
FIG. 3 is a perspective view showing an external-pulling operation performed by a hydraulic tool in accordance with the present invention.
Figure 4:
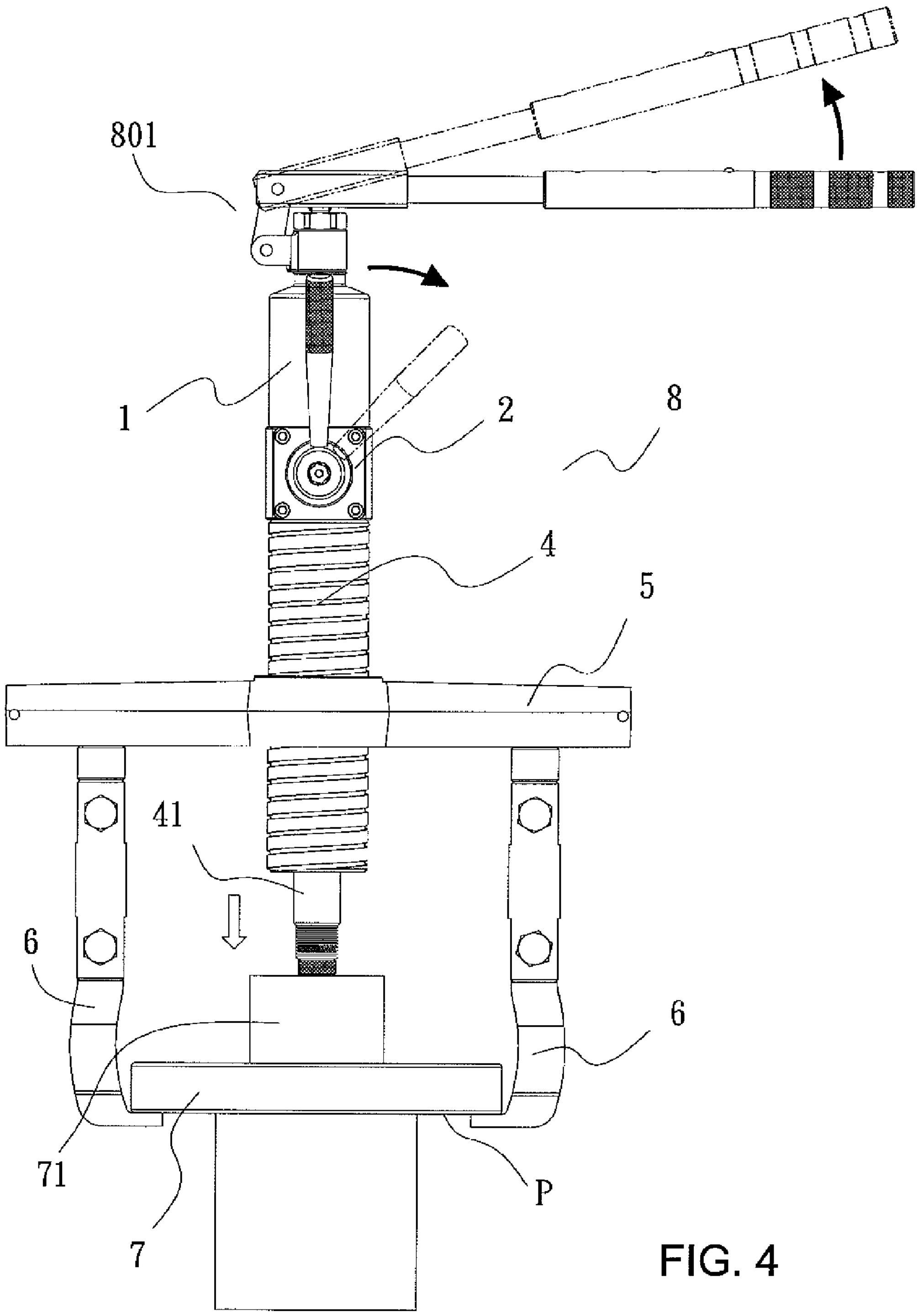
FIG. 4 is a front view showing the external-pulling operation performed by the hydraulic tool in accordance with the present invention.
Figure 4A:
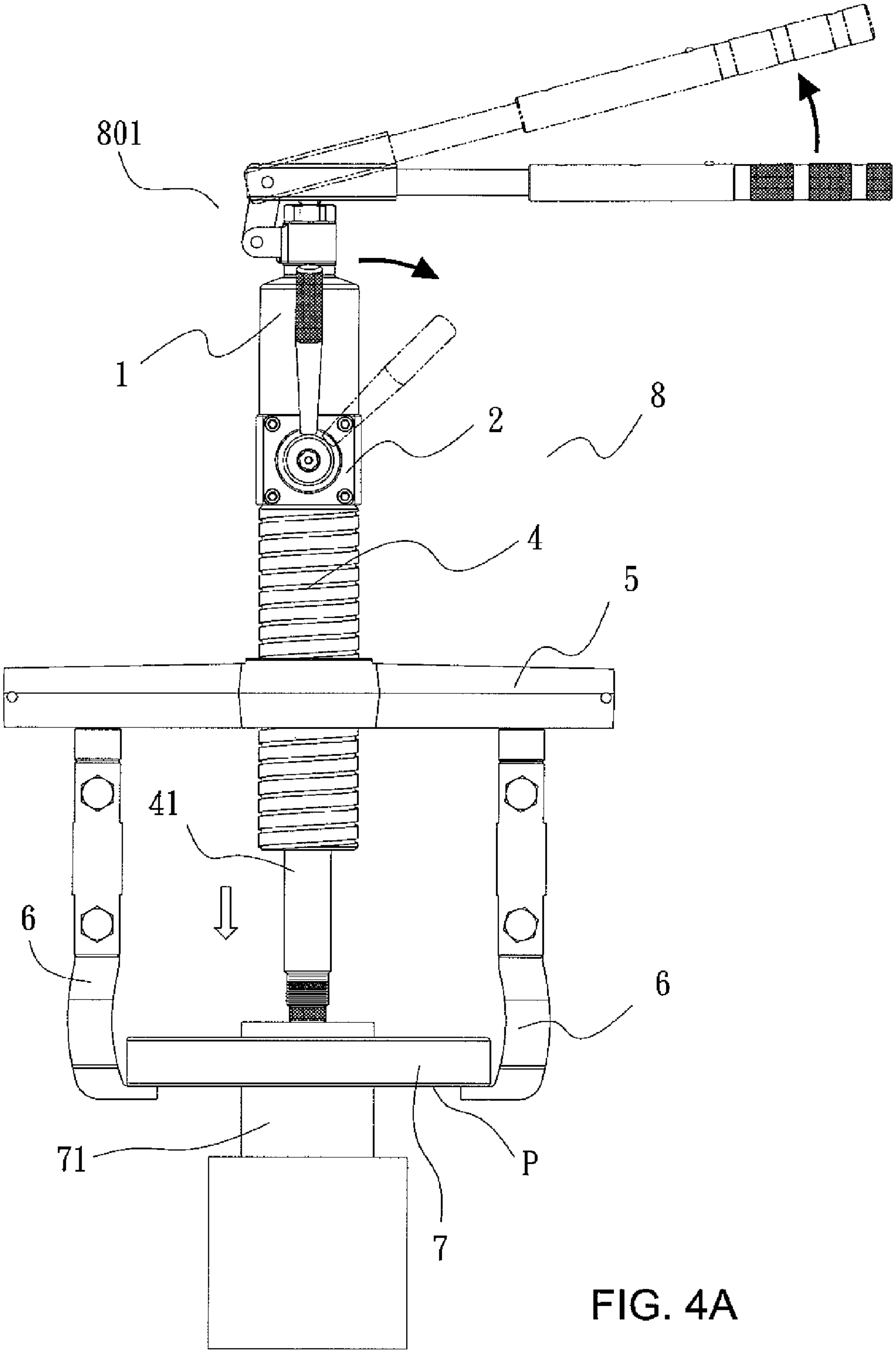
FIG. 4A shows the object externally pulled out from the shaft by the hydraulic tool in accordance with the present invention.

On the other hand, each of the clamping jaws 6 mounted on the bracket 5 can also clamp the bottom of the outer periphery P of the object 7. Meanwhile, the axial shaft 41 at one end of the oil pressure tank 3 pushes the shaft 71 of the object 7 downward (as shown in FIGS. 3, 4 and 4A), thus pulling out the object 7. This is an example of an external-pulling application.

Figure 5:
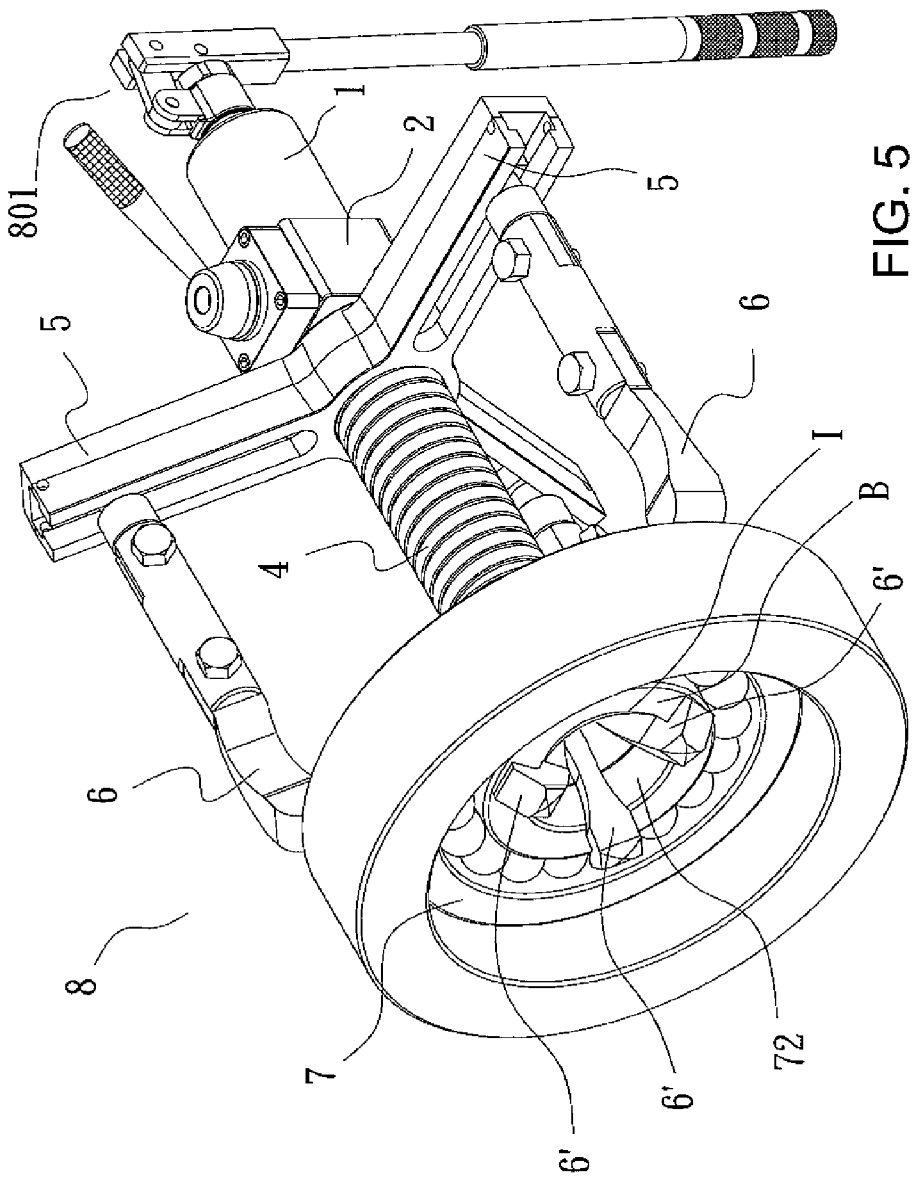
FIG. 5 is a perspective view showing an internal-pulling operation performed by a hydraulic tool in accordance with the present invention.
Figure 6:
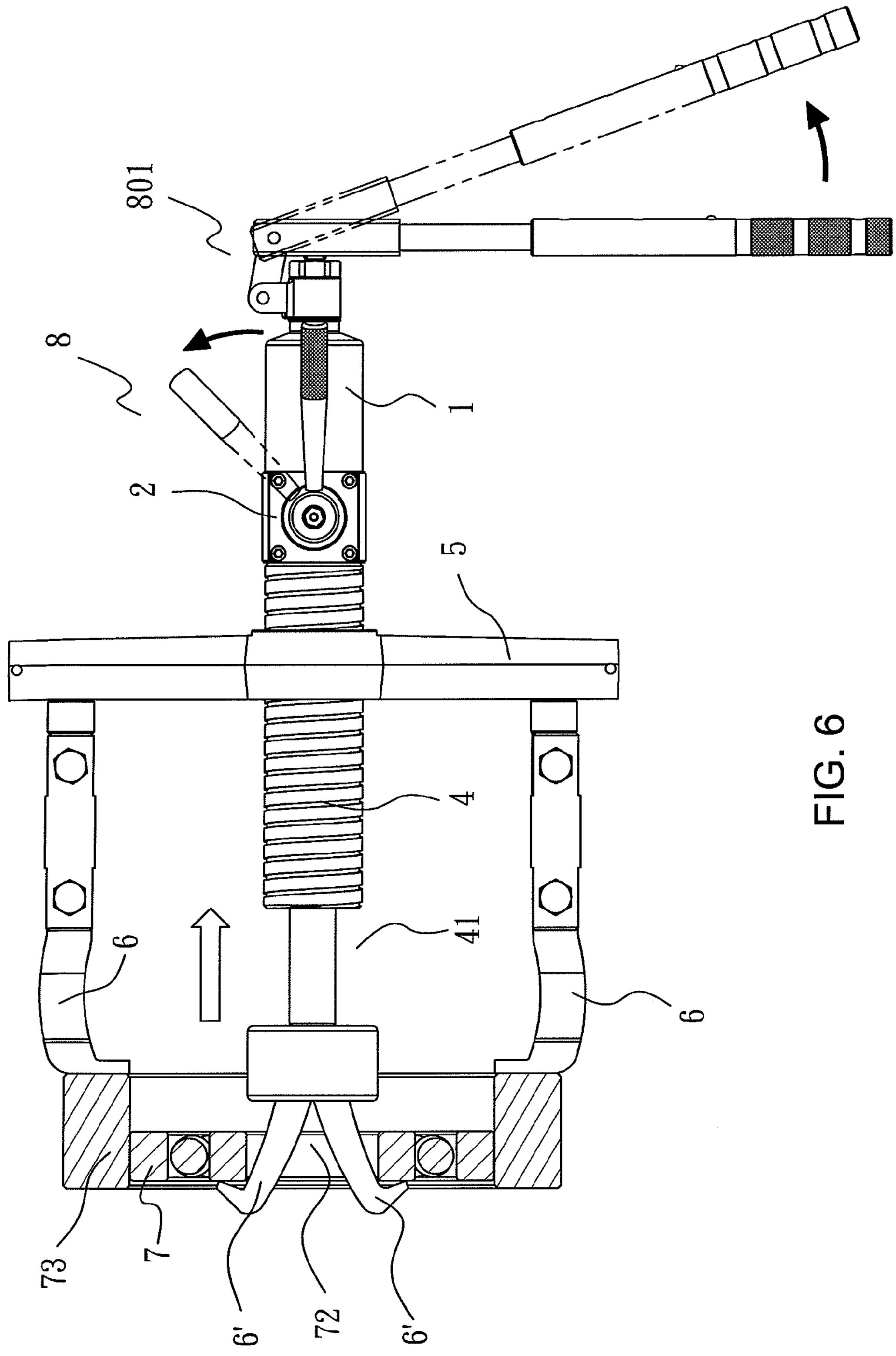
FIG. 6 is a front view showing the internal-pulling operation performed by the hydraulic tool in accordance with the present invention.
Figure 6A:
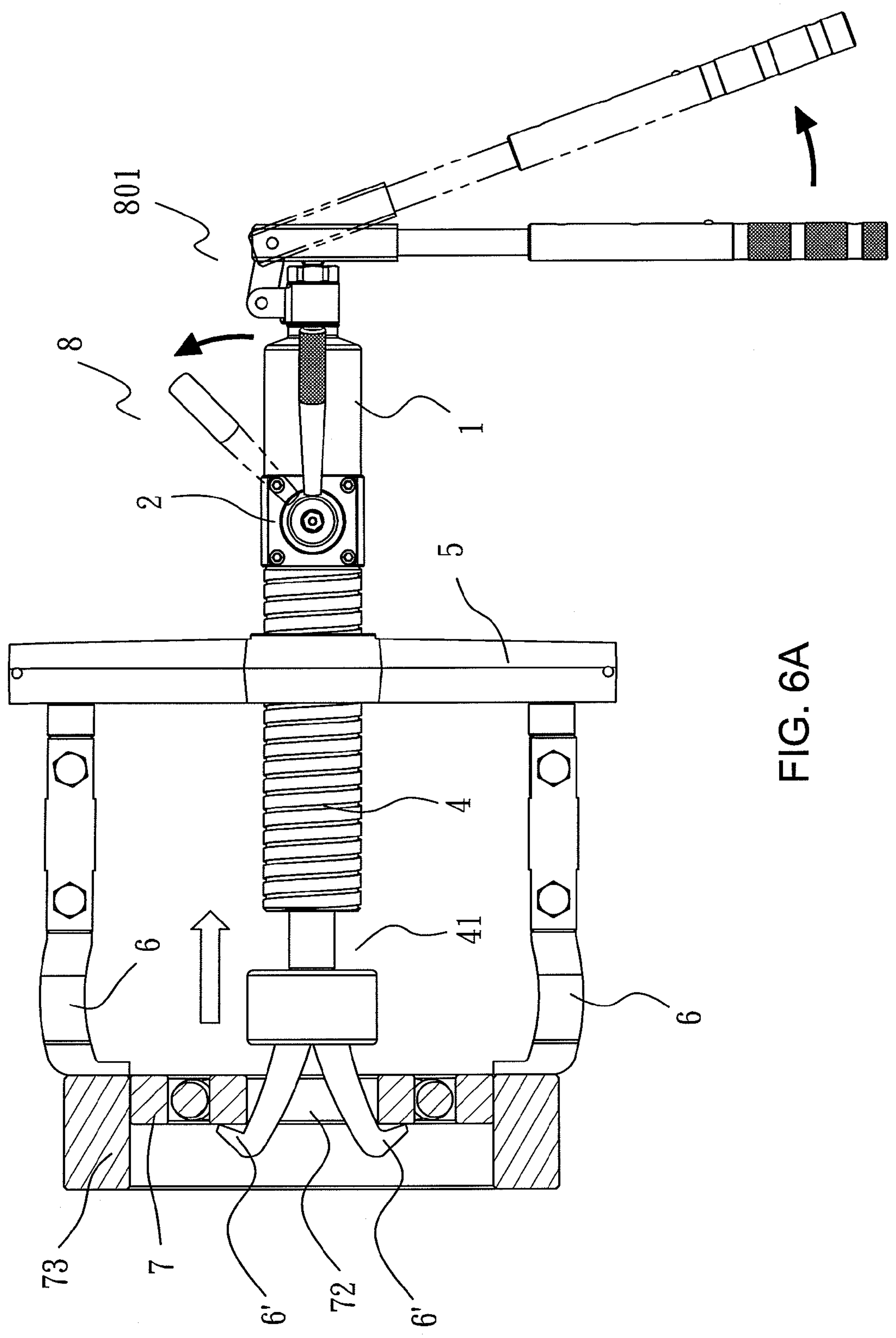
FIG. 6A shows the object internally pulled out from the shaft by the hydraulic tool in accordance with the present invention.
Figure 7:
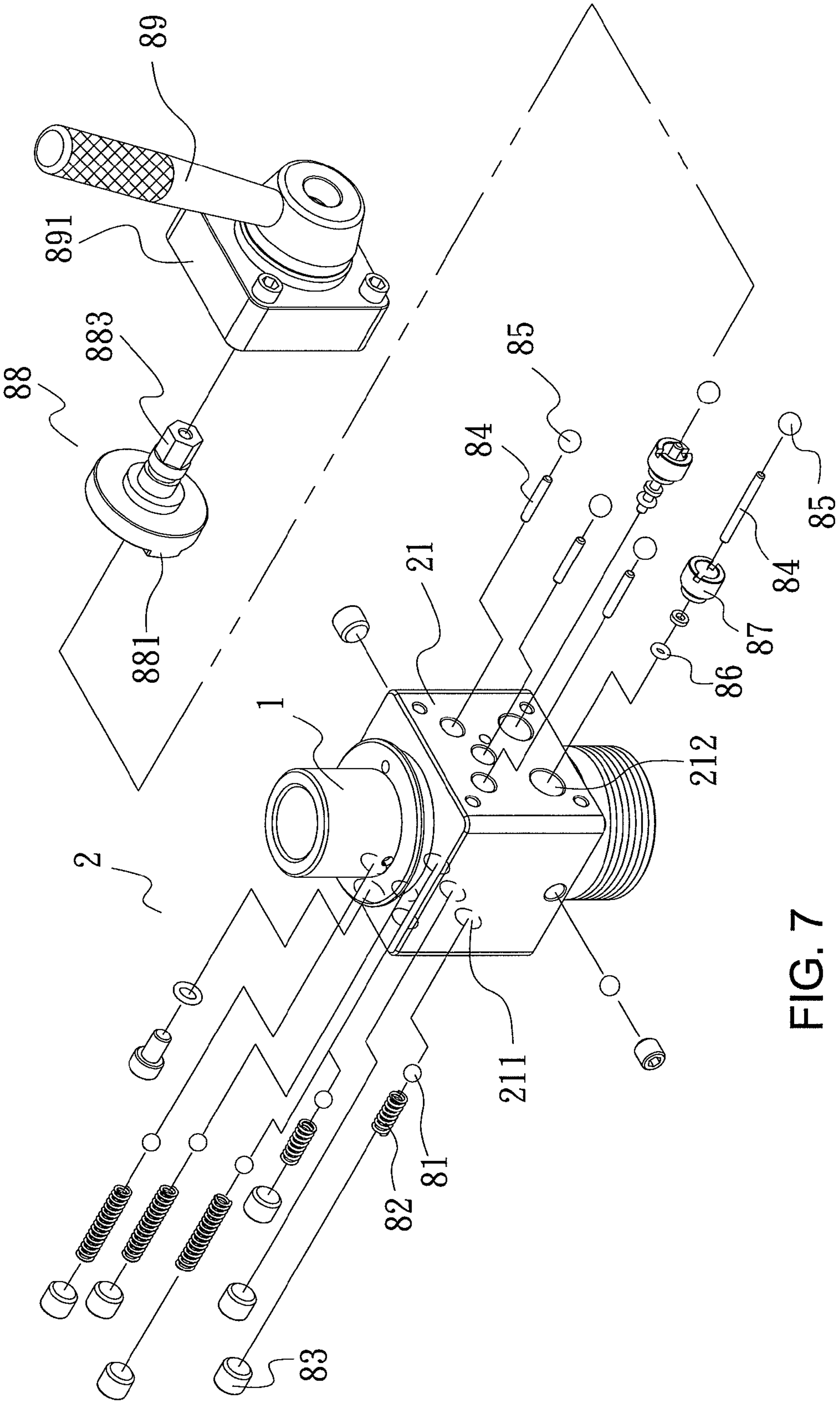
FIG. 7 is an exploded view of a control valve in accordance with the present invention.
Figure 8:
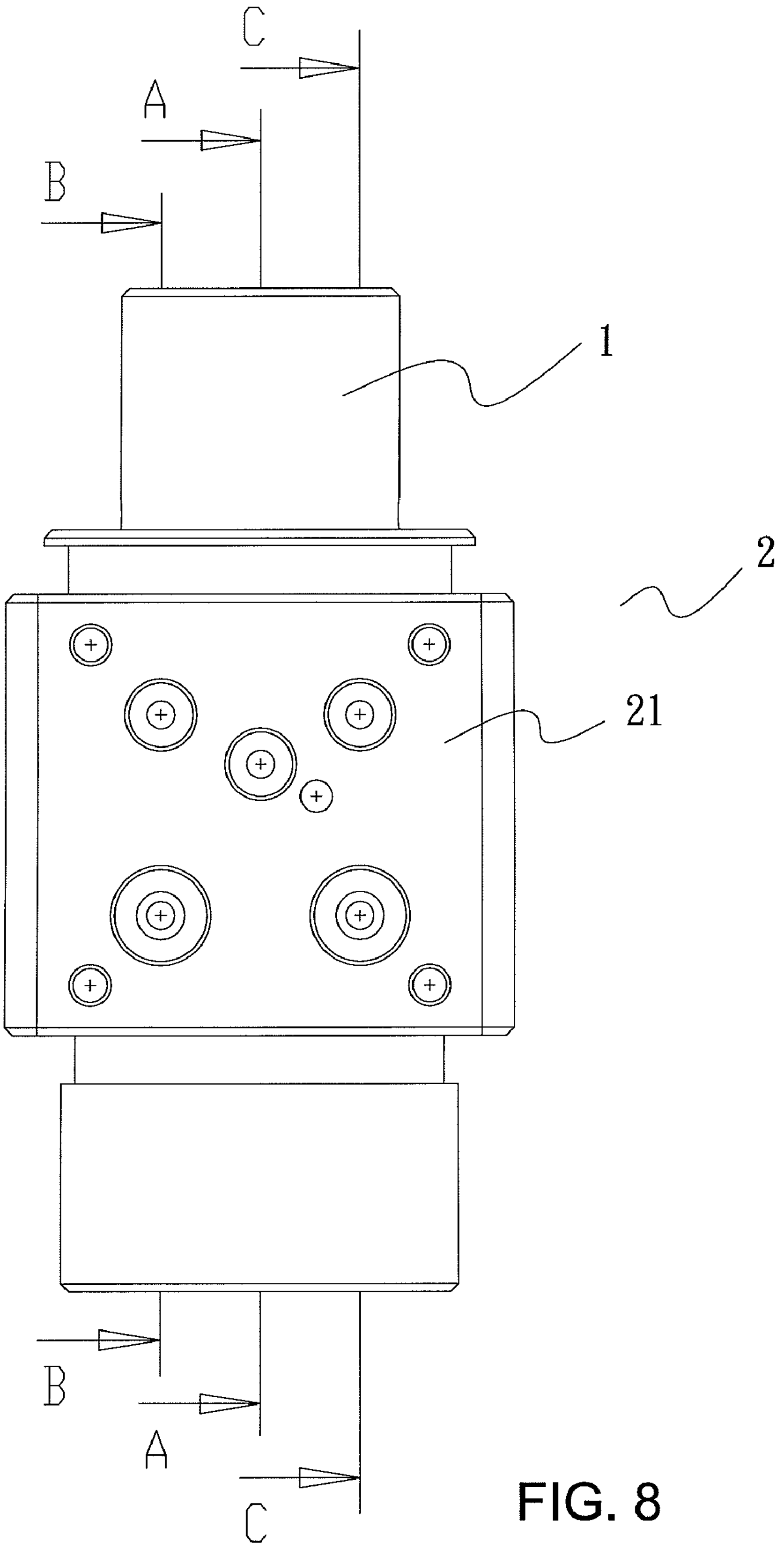
FIG. 8 is a front view of the control valve in accordance with the present invention.
Figure 9:
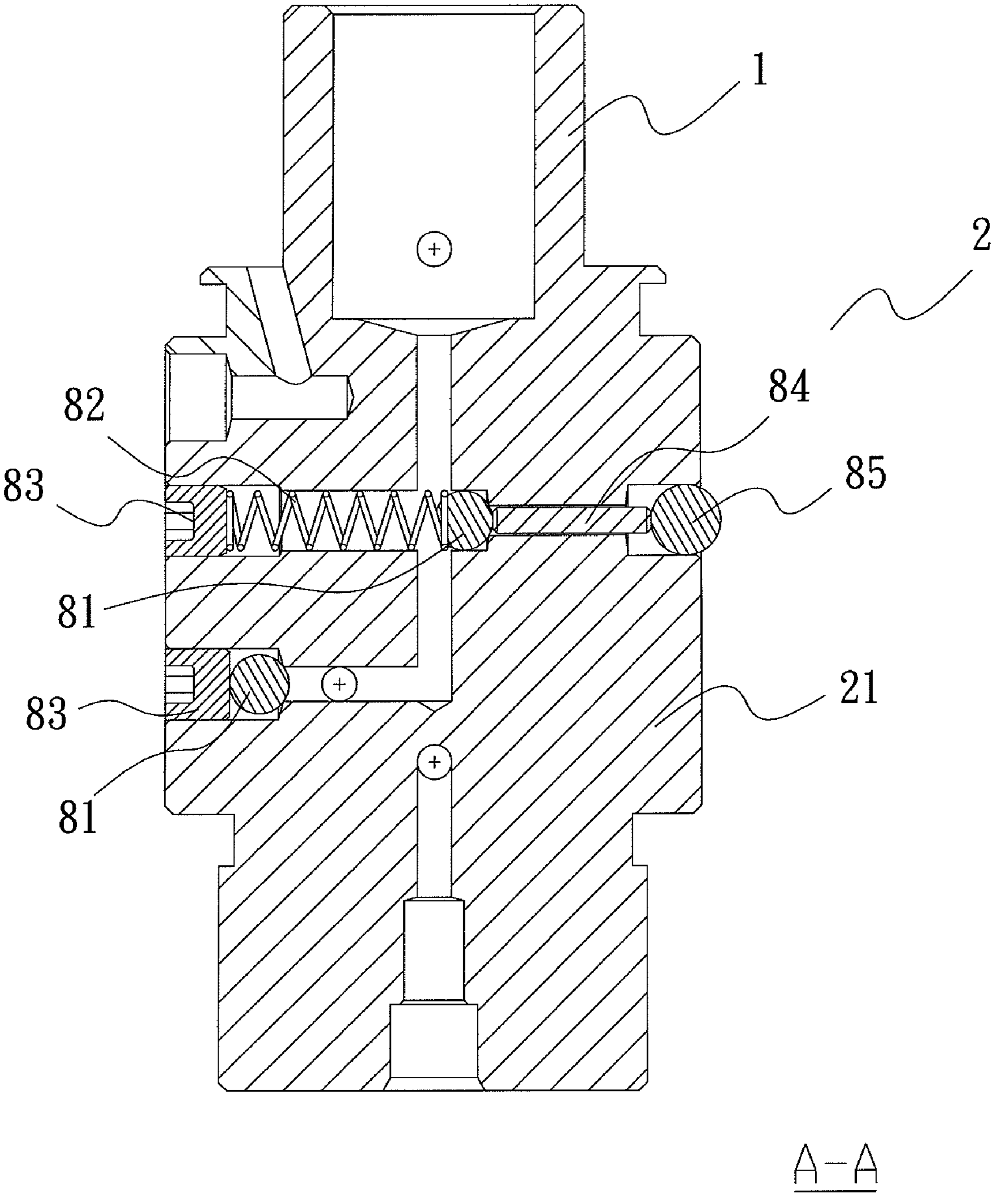
FIG. 9 is a cross sectional view taken along the line A-A of FIG. 8.
Figure 10:
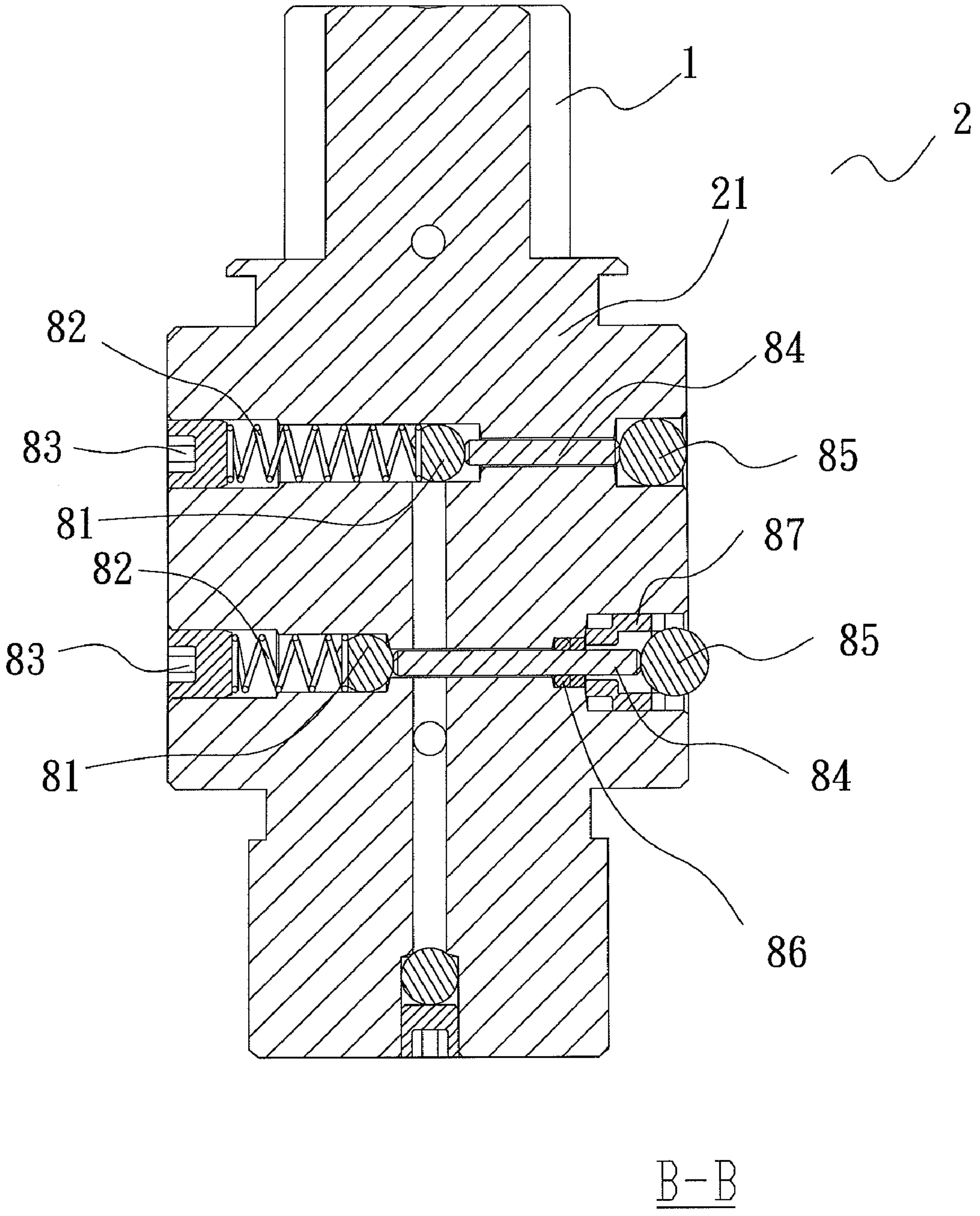
FIG. 10 is a cross sectional view taken along the line B-B of FIG. 8.
Figure 11:
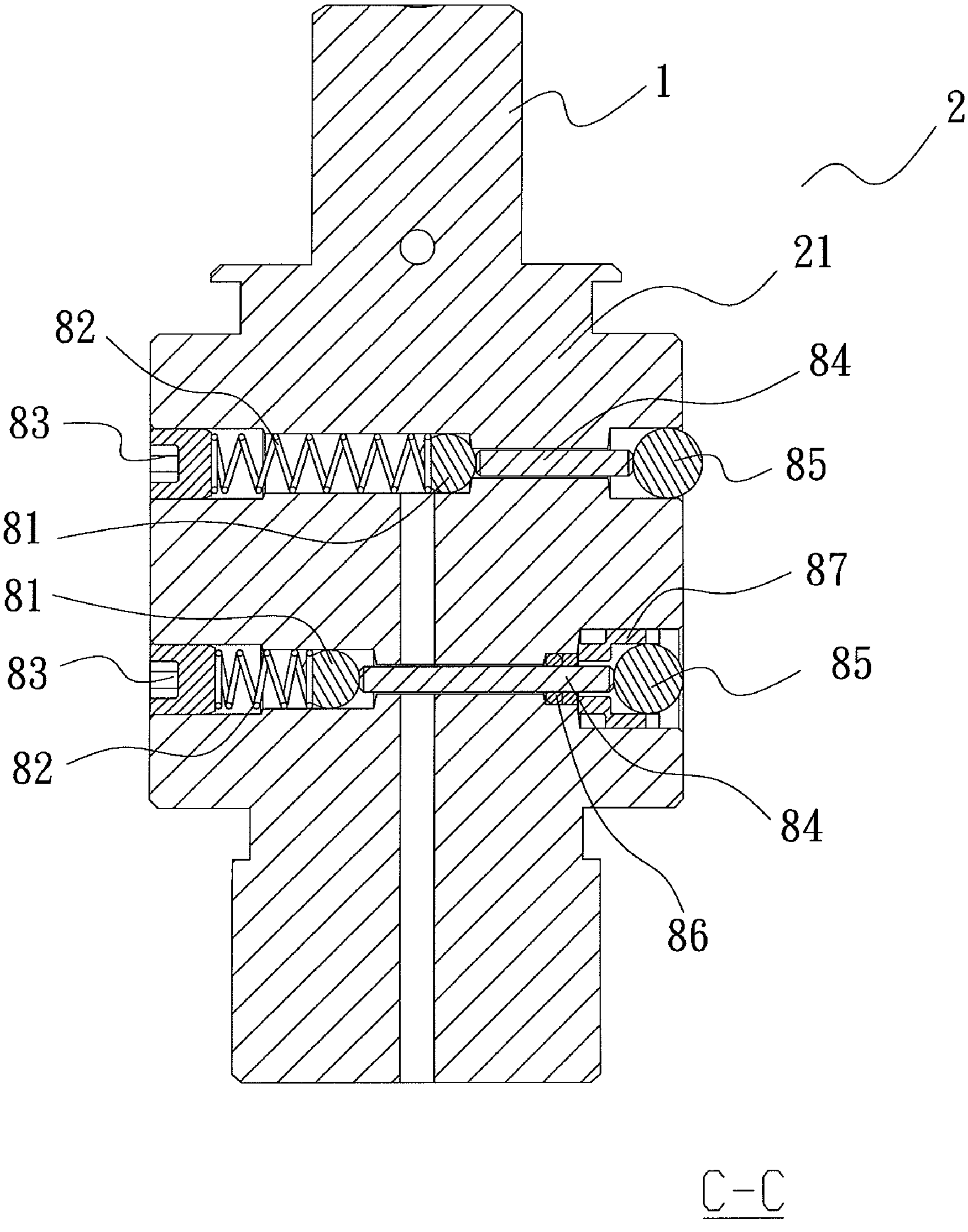
FIG. 11 is a cross sectional view taken along the line C-C of FIG. 8.

An internal-pulling embodiment of the present invention is shown in FIGS. 5, 6 and 6A and comprises hooks 6' inserted in the axial shaft 41 at one end of the oil pressure tank 3 with the adjustment threaded portion 4. The hooks 6' are to be clamped against the bottom B of the inner periphery I of the central hole 72 of the object 7 to be disassembled to pull the object 7 upward. Meanwhile, each of the hooks 6' is pressed against a peripheral component 73 around the object 7, thus pulling out the object 7, and this is called an internal-pulling operation.

Figure 13:
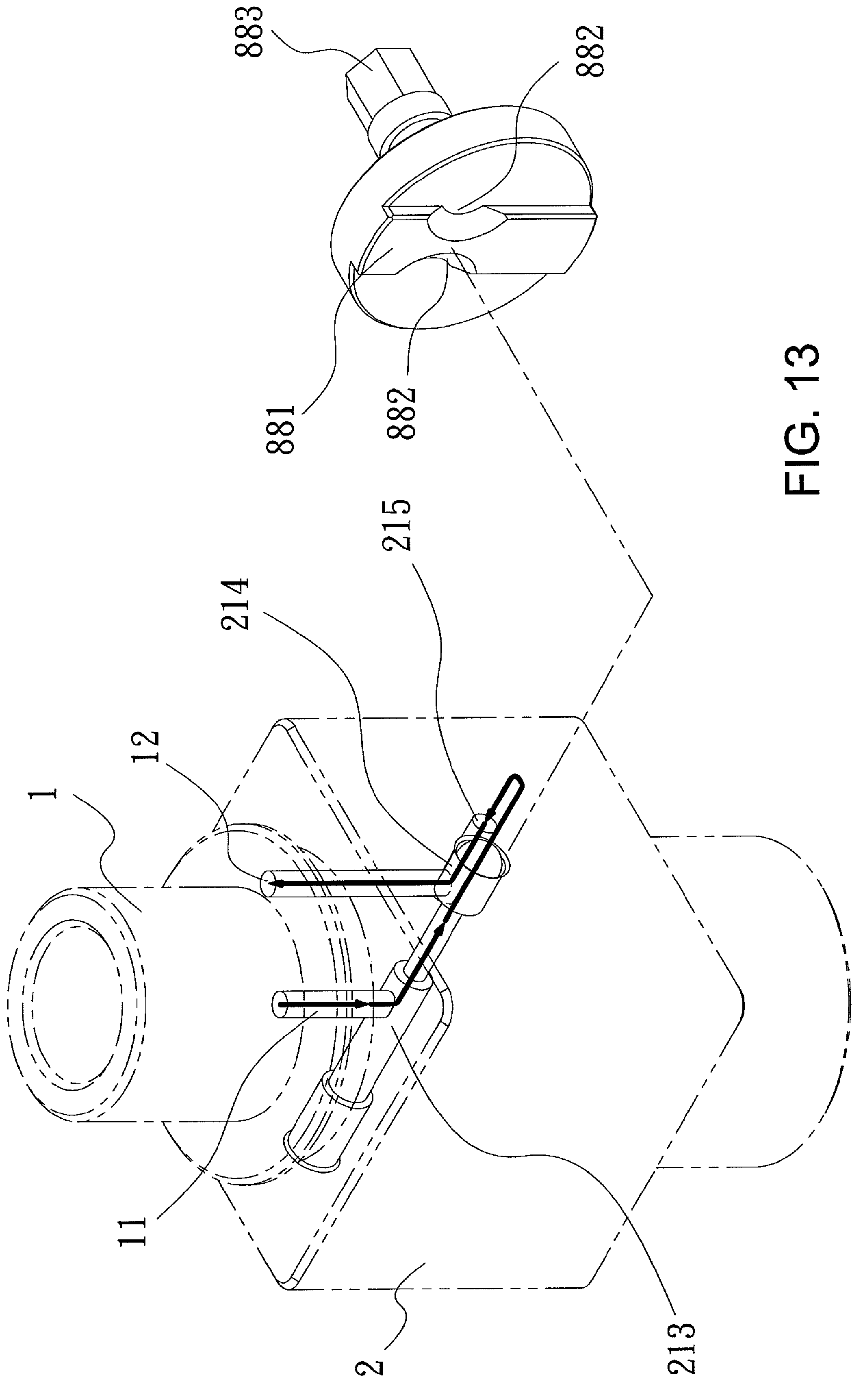
FIG. 13 shows the state of the oil circuit when the oil pressure tank is controlled in a non-operation state by the control valve.

FIGS. 7-11 show the control valve 2 disposed at one end of the oil storage member 1. A valve body 21 of the control valve 2 is defined with an oil circuit. In an opening 211 at an outer portion of the oil circuit are disposed a steel ball 81, an elastic member 82 and a plug 83, and in an opening 212 of another outer portion of the circuit are disposed a pin 84, a steel ball 85 or plural washers 86 and a socket 87 for insertion of the pin 84 and accommodation of the steel ball 85. In the meantime, a connecting member 88 with a protrusion 881 and two arc-shaped concaves 882 on an inner surface thereof facing the valve body 21 is assembled on the control valve 2 (as shown in FIG. 13). Extended from the outer surface of the connecting member 88 opposite the protrusion 881 is a hexagonal rod 883 to be engaged with a handle 89. The bearing seat 891 of the handle 89 is fixed to a corresponding surface of the valve body 21 through a plurality of screws.

When the hydraulic tool with the oil storage member 1 and the control valve 2 are used to perform an external-pulling or internal-pulling operation, the oil circuit of the control valve 2 is provided with different oil passages capable of adjusting oil flow to the oil pressure tank 3 desirably to the states of non-operation, forward movement and backward movement to achieve the desired external-pulling or internal-pulling function. A state of non-operation represents a state in which the oil pressure tank 3 is not working, a state of forward movement means a state in which the oil pressure tank 3 is moving forward, and a state of backward movement means a state in which the oil pressure tank 3 is moving backward.

Figure 12:
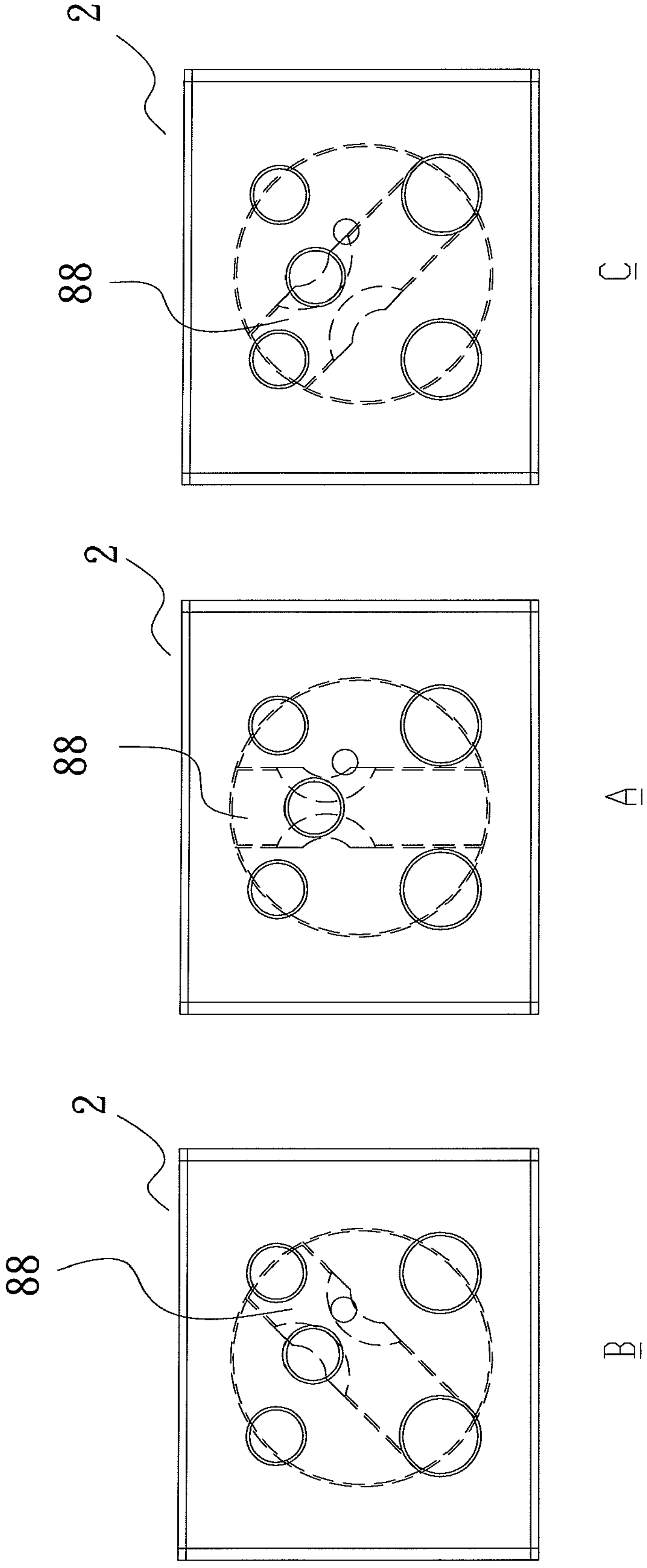
FIG. 12 shows the states of non-operation, forward movement and backward movement of the oil pressure tank controlled by the handle fixed on the control valve.

The state of non-operation of the oil pressure tank 3 is shown in FIGS. 12A and 13. The handle 89 is moved to the center such that the oil from an inlet 11 of the oil storage member 1 will flow through a return passage 213, a return chamber 214, and a return hole 215 and back into the oil storage member 1 via an inlet 12 thereof.

Figure 14:
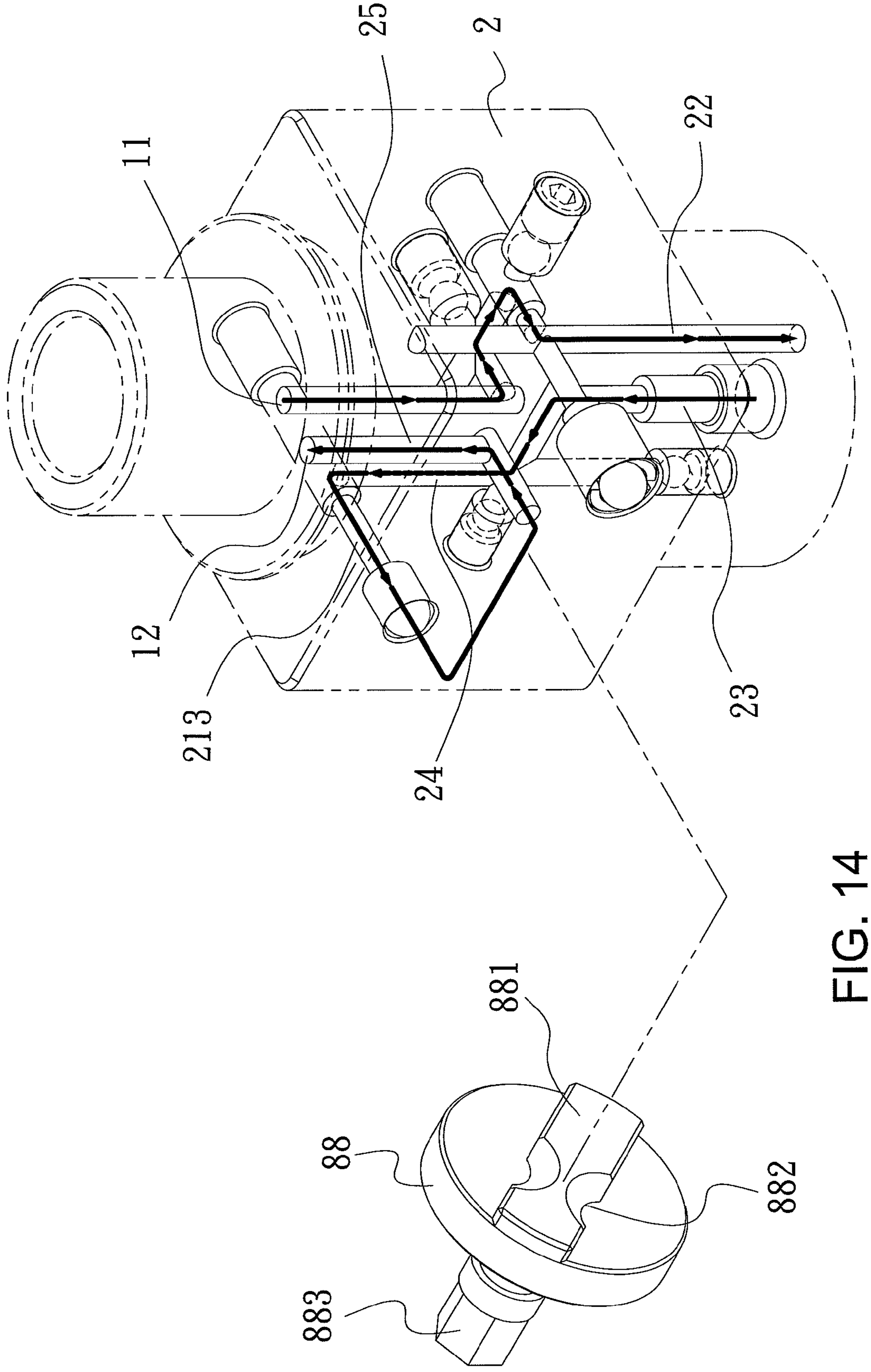
FIG. 14 shows the state of the oil circuit when the oil pressure tank is controlled in a forward movement state by the control valve.
Figure 15:
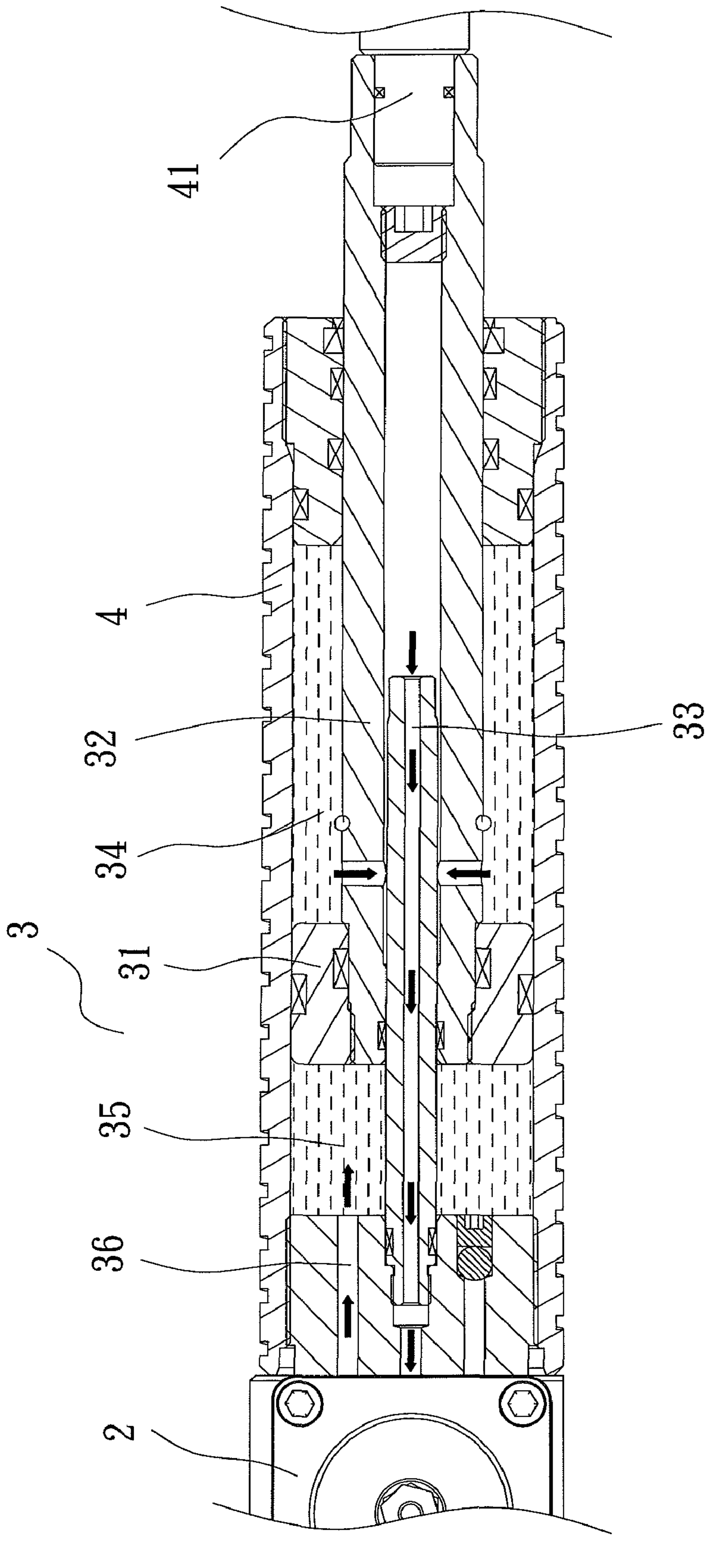
FIG. 15 is a cross sectional view showing the state of the oil circuit when the oil press tank moves forward.
Figure 16:
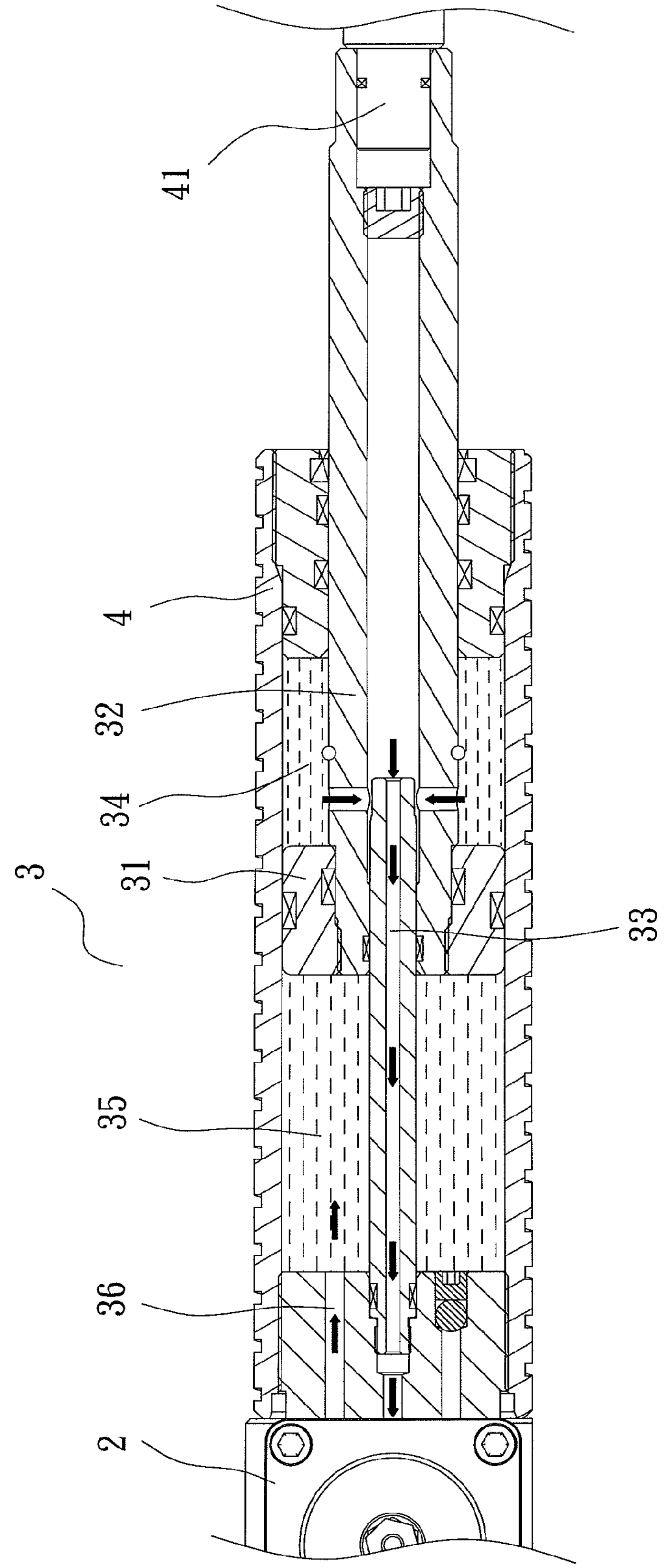
FIG. 16 is another cross sectional view showing the state of the oil circuit when the oil press tank moves forward.

The state of forward movement of the oil pressure tank 3 is shown in FIGS. 12B and 14. The handle 89 is moved toward a side so that the oil from the inlet 11 of the oil storage member 1 flows into the oil pressure tank 3 via a first oil passage 22 (as shown in FIG. 15) to push a piston 31 of the oil pressure tank 3 outward. Accordingly, the axial shaft 41 connected at the end of a piston rod 32 is also pushed outward (as shown in FIG. 16). At the same time, when the pressure of the oil flowing into the oil pressure tank 3 reaches a maximum value, the oil will flow through an oil chamber 33 inside of the piston rod 32 to a second oil passage 23 (as shown in FIG. 14), then flow through a third oil passage 24 into the return passage 213, and finally flow back into the oil storage member 1 via a fourth oil passage 25 at one end of the inlet 12. The forward movement of the oil pressure tank 3 can perform an external-pulling operation for the object 7 to be disassembled (as shown in FIGS. 3, 4 and 4A).

Figure 17:
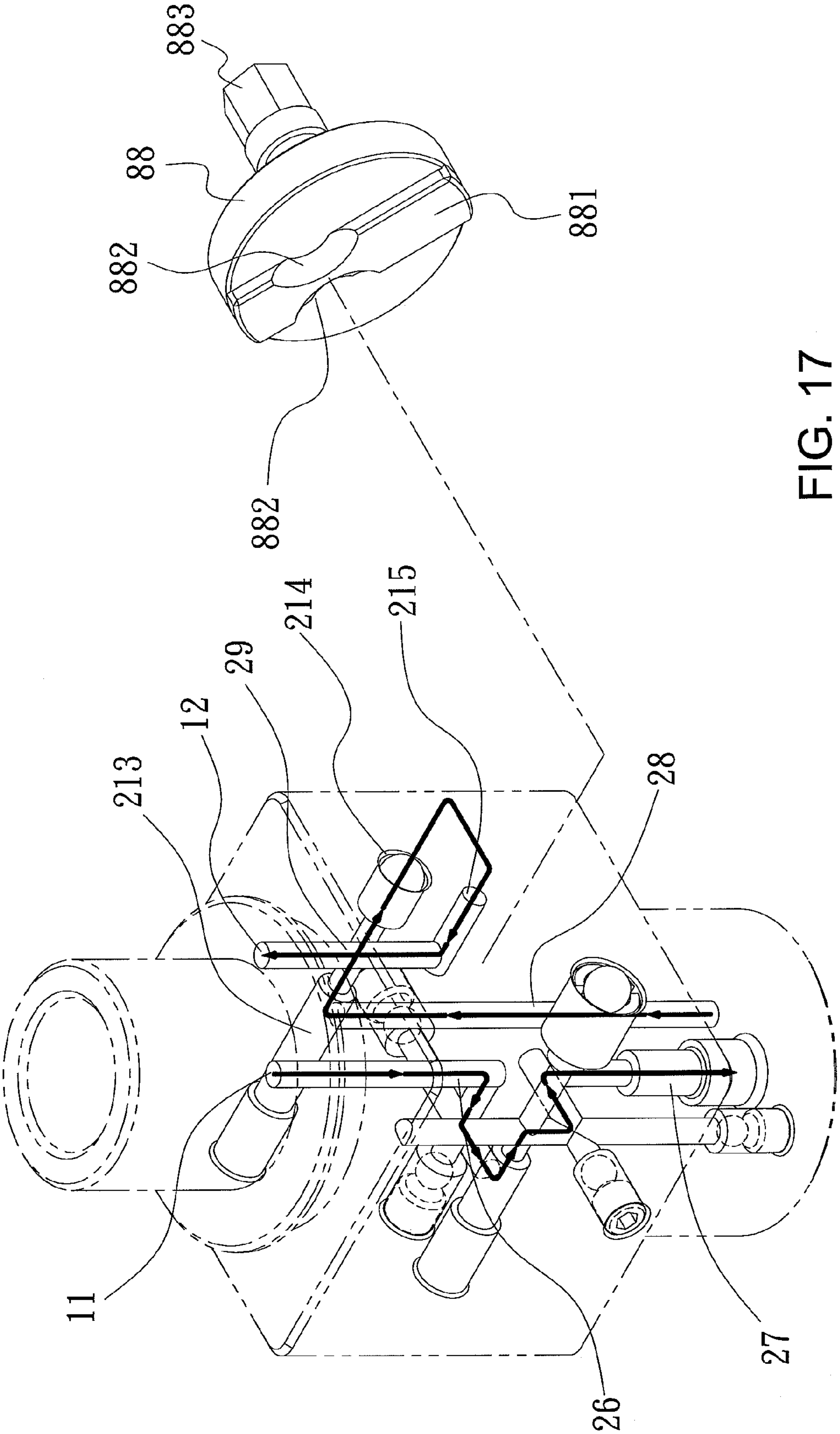
FIG. 17 shows the state of the oil circuit when the oil pressure tank is controlled in a backward movement state by the control valve.
Figure 18:
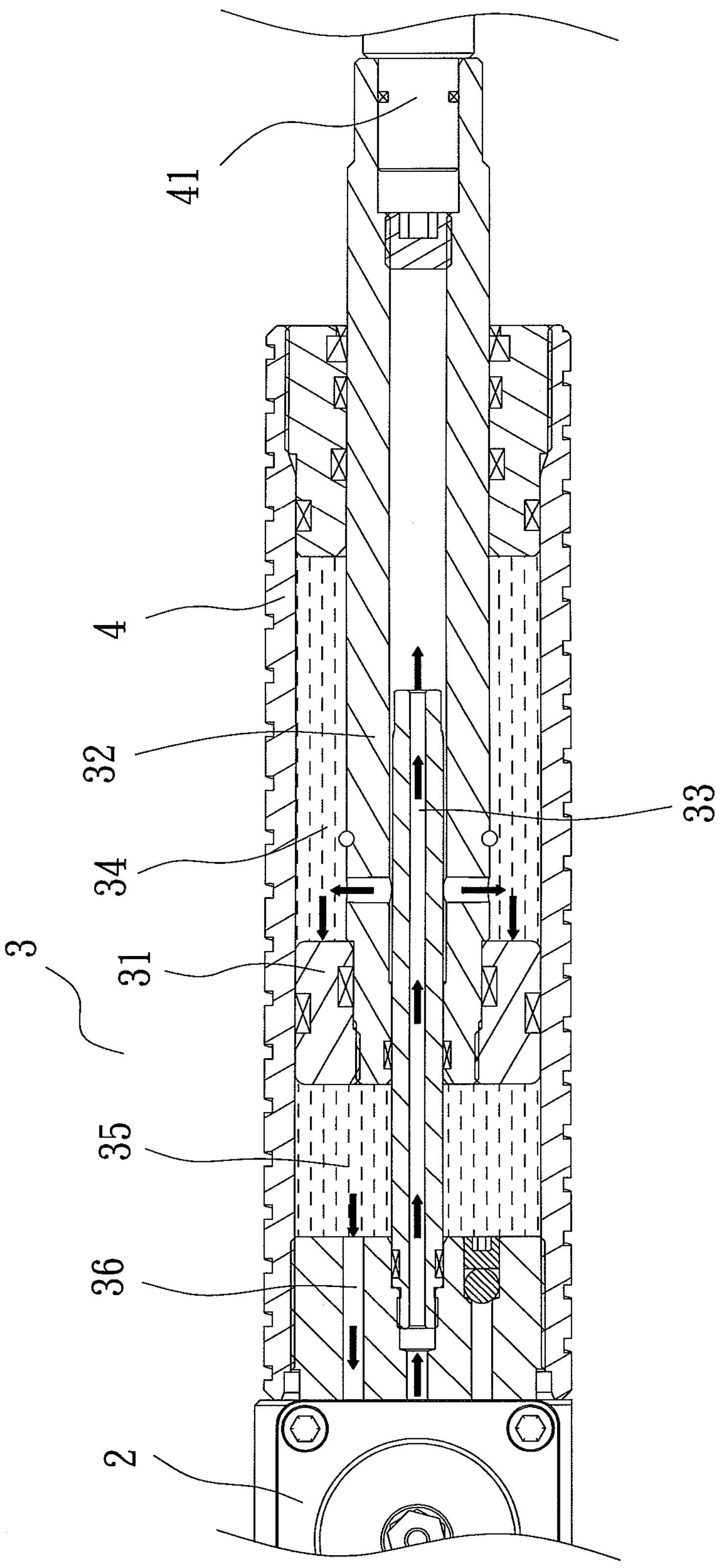
FIG. 18 is a cross sectional view showing the state of the oil circuit when the oil press tank moves backward.
Figure 19:
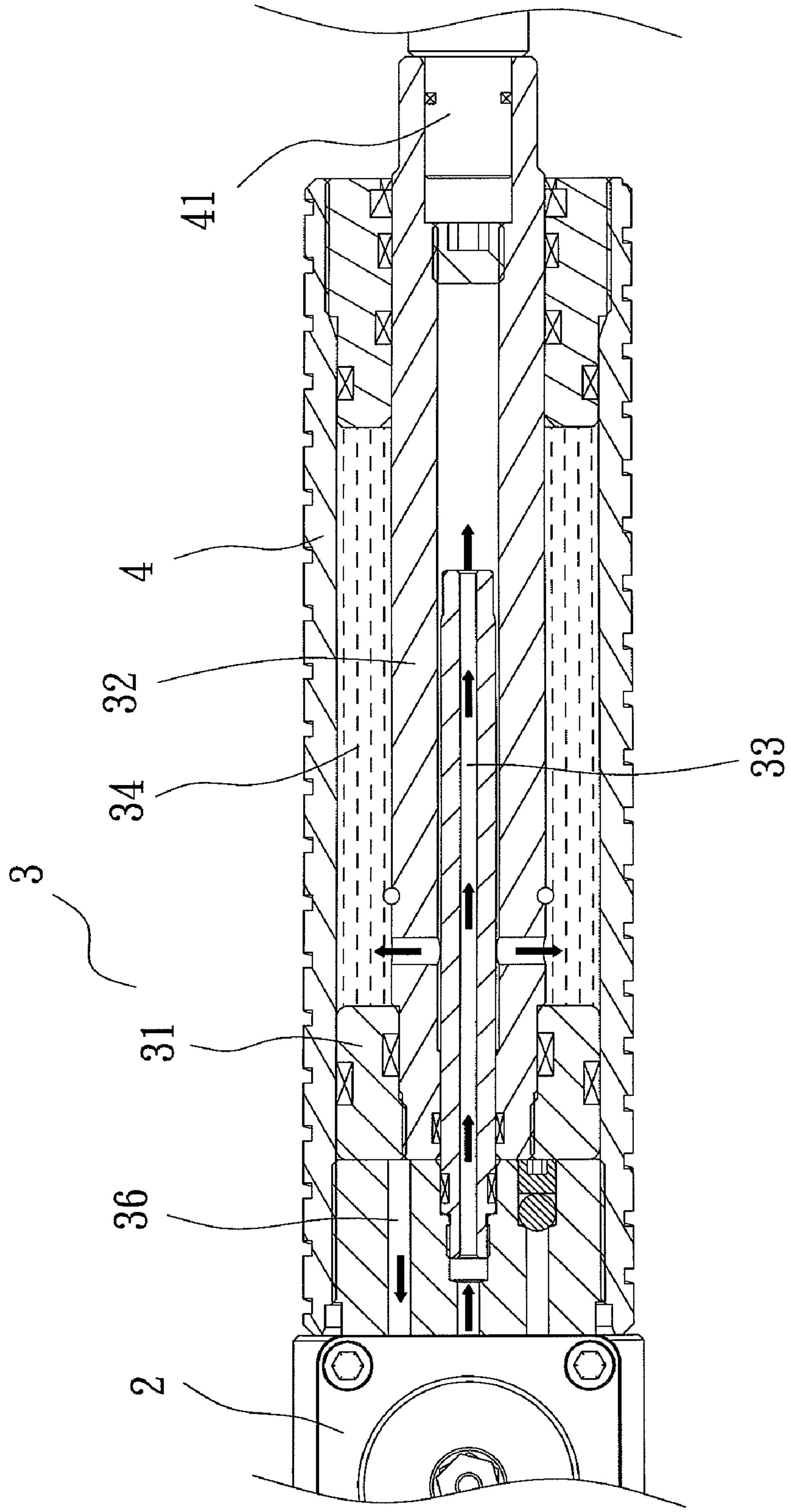
FIG. 19 is another cross sectional view showing the state of the oil circuit when the oil press tank moves backward.

The state of backward movement of the oil pressure tank 3 is shown in FIGS. 12C and 17. The handle 89 is moved toward another side so that the oil from the inlet 11 of the oil storage member 1 will flow into a sixth oil passage 27 at one end of the oil pressure tank 3 via a fifth oil passage 26 and flow into the piston rod 32 (as shown in FIG. 18) and then into an oil chamber 34 at the other end of the oil pressure tank 3, thus pushing the piston 31 together with the axial shaft 41 connected at the end of the piston rod 32 backward (as shown in FIG. 19). At the same time, the oil of an oil chamber 35 at the front end of the oil pressure tank 3 can flow out via an outlet 36 (as shown in FIG. 18) to a seventh oil passage 28 (as shown in FIG. 17) of the control valve 2 and then flow through an eighth oil passage 29 at one end of the inlet 12 of the oil storage member 1 and back into the oil storage member 1. The backward movement of the oil pressure tank 3 controlled by the control valve 2 is used to perform an internal-pulling operation (as shown in FIGS. 5, 6 and 6A) for the object 7 or to assemble the object 7 onto the shaft (as shown in FIGS. 1, 2 and 2A).

The hydraulic tool 8 can be assembled differently to meet the requirements of internal-pulling or external-pulling. The oil circuit of the control valve 2 is provided with different oil passages capable of adjusting oil flow to the oil pressure tank 3 desirably to the states of non-operation, forward movement and backward movement to achieve the desired external-pulling or internal-pulling function. Hence, the hydraulic tool 8 has a wider application scope and is capable of assembling and disassembling the object.

While various embodiments in accordance with the present invention have been shown and described, it is clear to those skilled in the art that further embodiments may be made without departing from the scope of the present invention.

What is claimed is:

1. A hydraulic tool, performing an external-pulling operation for an object to be disassembled, and having an outer periphery and a shaft comprising: clamping jaws; an oil pressure tank; an axial shaft; an oil storage member; and a handle fixed to a control valve movable toward a side to move the oil pressure tank forward, with oil from an inlet of the oil storage member flowing into the oil pressure tank via a first oil passage to push a piston of the oil pressure tank outward, wherein the axial shaft connected at an end of a piston rod is also pushed outward, and wherein at the same time, when the pressure of the oil flowing into the oil pressure tank reaches a maximum value, the oil will flow through an oil chamber inside of the piston rod to a second oil passage and then flow through a third oil passage into a return passage, and finally flow back into the oil storage member via a fourth oil passage at one end of the inlet of the oil storage member, with each of the clamping claws pressing against the outer periphery and the axial shaft pushing against the shaft of the object.

2. A hydraulic tool, performing an internal-pulling operation for an object to be disassembled, and having a bottom of an inner periphery of a central hole and a peripheral component comprising:

clamping jaws; an oil pressure tank; an axial shaft; an oil storage member; and; a handle fixed to a control valve and movable toward a side, with oil from an outlet of the oil storage member flowing into a first oil passage at one end of the oil pressure tank via a second oil passage and flowing into a piston rod and then into an oil chamber at an end of the oil pressure tank, with a piston together with an axial shaft connected at one end of the piston rod being pushed, wherein at the same time, the oil of the oil chamber at a front end of the oil pressure tank flowing out via an outlet to a third oil passage of the control valve and then flowing through a fourth oil passage at one end of the inlet of the oil storage member and back into the oil storage member with each of the clamping jaws clamping against the bottom of the inner periphery of the central hole and pressing against the peripheral component.

* * * * *